US012128400B2

(12) United States Patent
Park et al.

(10) Patent No.: US 12,128,400 B2
(45) Date of Patent: Oct. 29, 2024

(54) HIGH-SPEED SCREENING AND ANALYSIS SYSTEM FOR REACTION OPTIMIZATION

(71) Applicant: LG Chem, Ltd., Seoul (KR)

(72) Inventors: Byung Hyun Park, Daejeon (KR); Byoung Hyoun Kim, Daejeon (KR); Su Youn Han, Daejeon (KR); Sikwon Moon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 247 days.

(21) Appl. No.: 16/772,472

(22) PCT Filed: Aug. 29, 2019

(86) PCT No.: PCT/KR2019/011045
§ 371 (c)(1),
(2) Date: Jun. 12, 2020

(87) PCT Pub. No.: WO2020/046006
PCT Pub. Date: Mar. 5, 2020

(65) Prior Publication Data
US 2020/0398270 A1 Dec. 24, 2020

(30) Foreign Application Priority Data
Aug. 30, 2018 (KR) ........................ 10-2018-0102650

(51) Int. Cl.
*B01L 3/00* (2006.01)

(52) U.S. Cl.
CPC ....... *B01L 3/5023* (2013.01); *B01L 2200/141* (2013.01); *B01L 2300/0803* (2013.01); *B01L 2300/126* (2013.01); *B01L 2300/165* (2013.01)

(58) Field of Classification Search
CPC ............ B01L 3/5023; B01L 2200/141; B01L 2300/0803; B01L 2300/126;
(Continued)

(56) References Cited

U.S. PATENT DOCUMENTS 4,456,581 A 6/1984 Edelmann et al.
6,632,656 B1 10/2003 Thomas et al.
(Continued)

FOREIGN PATENT DOCUMENTS

CN 1662802 A 8/2005
CN 102914536 A 2/2013
(Continued)

OTHER PUBLICATIONS

Afridi, H.I., Kazi, T.G., Kazi, N. et al. Association of Environmental Toxic Elements in Biological Samples of Myocardial Infarction Patients at Different Stages. Biol Trace Elem Res 141, 26-40 (2011). https://doi.org/10.1007/s12011-010-8713-2 (Year: 2011).*
(Continued)

*Primary Examiner* — Matthew D Krcha
*Assistant Examiner* — Sophia Y Lyle
(74) *Attorney, Agent, or Firm* — Lerner David LLP

(57) ABSTRACT

The present invention relates to a high-speed screening and analysis system for reaction optimization. More specifically, the present invention provides a system capable of analyzing samples at low cost through control of fluids using hydrophilic plate-like material (for example, paper), and of analyzing chemical reactions of a sample with a plurality of materials simultaneously, thereby allowing samples to be analyzed rapidly.

5 Claims, 7 Drawing Sheets

(58) Field of Classification Search

CPC ....... B01L 2300/165; B01L 2200/0642; B01L 2300/069; B01L 2300/0864; B01L 2400/086; B01L 3/502707; B01L 2400/0406; B01L 3/50273; B01L 2300/0883; B01L 2400/00

See application file for complete search history.

(56) References Cited

U.S. PATENT DOCUMENTS

| | | | | |
|---|---|---|---|---|
| 7,429,354 | B2 | 9/2008 | Andersson et al. | |
| 2001/0001060 | A1 | 5/2001 | Kellogg et al. | |
| 2001/0036634 | A1 * | 11/2001 | Chow | C12Q 1/686 435/6.12 |
| 2002/0027133 | A1 | 3/2002 | Kellogg et al. | |
| 2002/0151078 | A1 | 10/2002 | Kellogg et al. | |
| 2003/0203495 | A1 * | 10/2003 | Rupp | G01N 31/22 422/423 |
| 2004/0058408 | A1 | 3/2004 | Thomas et al. | |
| 2004/0063169 | A1 | 4/2004 | Kane | |
| 2006/0057554 | A1 | 3/2006 | Watling et al. | |
| 2007/0042444 | A1 * | 2/2007 | Niskanen | B01L 3/5023 436/514 |
| 2007/0098600 | A1 * | 5/2007 | Kayyem | G01N 27/447 435/293.1 |
| 2009/0274579 | A1 | 11/2009 | Orwar et al. | |
| 2013/0034869 | A1 | 2/2013 | Whitesides et al. | |
| 2013/0302830 | A1 * | 11/2013 | Mehra | G01N 33/558 422/69 |
| 2014/0038209 | A1 | 2/2014 | Shih et al. | |
| 2014/0134074 | A1 | 5/2014 | Ovaska et al. | |
| 2014/0287954 | A1 * | 9/2014 | Cooney | B01J 19/0046 506/9 |
| 2015/0260713 | A1 | 9/2015 | Ghaffari et al. | |
| 2015/0309063 | A1 | 10/2015 | Oh et al. | |
| 2015/0367341 | A1 * | 12/2015 | Zhou | B01L 3/502746 422/430 |
| 2016/0051980 | A1 * | 2/2016 | Hong | G01N 33/558 506/39 |
| 2016/0220998 | A1 | 8/2016 | Zhou et al. | |
| 2018/0071736 | A1 | 3/2018 | Qin et al. | |
| 2018/0136243 | A1 | 5/2018 | Boehm et al. | |
| 2019/0283018 | A1 | 9/2019 | Huang | |
| 2019/0302097 | A1 | 10/2019 | Niu et al. | |

FOREIGN PATENT DOCUMENTS

| | | | | |
|---|---|---|---|---|
| CN | 103341372 | A | 10/2013 | |
| CN | 103566984 | A | 2/2014 | |
| CN | 103777003 | A | 5/2014 | |
| CN | 104871000 | A | 8/2015 | |
| CN | 105890927 | A | 8/2016 | |
| CN | 105903502 | A | 8/2016 | |
| CN | 106076445 | A | 11/2016 | |
| CN | 107199061 | A | 9/2017 | |
| CN | 107469745 | A | 12/2017 | |
| DE | 03044372 | A1 | 7/1982 | |
| DE | 19852835 | A1 | 5/2000 | |
| JP | 2002512783 | A | 5/2002 | |
| JP | 2003028883 | A | 1/2003 | |
| JP | 2004528829 | A | 9/2004 | |
| JP | 2004529312 | A | 9/2004 | |
| JP | 2016008968 | A | 1/2016 | |
| JP | 2016045199 | A | 4/2016 | |
| JP | 2017512986 | A | 5/2017 | |
| KR | 20050009295 | A | 1/2005 | |
| KR | 100840696 | B1 | 6/2008 | |
| KR | 20100015035 | A | 2/2010 | |
| KR | 20100085830 | A | 7/2010 | |
| KR | 101412777 | B1 | 7/2014 | |
| KR | 101493051 | B1 | 2/2015 | |
| KR | 20160024780 | A | 3/2016 | |
| KR | 101662802 | B1 | 10/2016 | |
| KR | 2017027366 | A * | 3/2017 | B01L 3/5027 |
| KR | 20170027366 | A | 3/2017 | |
| KR | 20170082845 | A | 7/2017 | |
| WO | 9853311 | A2 | 11/1998 | |
| WO | 9955827 | A1 | 11/1999 | |
| WO | WO-2007092713 | A2 * | 8/2007 | B01L 3/502761 |
| WO | 2010102294 | A1 | 9/2010 | |
| WO | WO-2015181790 | A1 * | 12/2015 | C12Q 1/04 |
| WO | 2016083975 | A1 | 6/2016 | |
| WO | 2017178417 | A1 | 10/2017 | |

OTHER PUBLICATIONS

Extended European Search Report for Application No. 19853949.6 dated Dec. 15, 2020, 10 pages.

Jafry Ali Turab et al: "A comparative study of paper-based microfluidic devices with respect to channel geometry", Colloids and Surfaces A: Physiochemical and Engineering Aspects, Elsevier, Amsterdam, NL, vol. 492, Jan. 4, 2016 (Jan. 4, 2016), pp. 190-198, XP029397304.

Lin Yang et al: "Detection of heavy metal by paper-based microfluidics", Biosensors and Bioelectronics, Elsevier Science LTD, UK, Amsterdam, NL, vol. 83, Apr. 21, 2016 (Apr. 21, 2016), pp. 256-266, XP029533424.

Chinese Search Report for Application No. 201980005808.X dated May 8, 2021, pp. 1-4.

Search Report from International Application No. PCT/KR2019/011045, mailed on Dec. 23, 2019; 2 pages.

Rattanarat P, Dungchai W, Cate D, Volckens J, Chailapakul O, Henry CS. Multilayer paper-based device for colorimetric and electrochemical quantification of metals. Analytical chemistry. Apr. 1, 2014;86(7):3555-62.

Hossain SZ, Brennan JD. β-Galactosidase-based colorimetric paper sensor for determination of heavy metals. Analytical chemistry. Nov. 15, 2011;83(22):8772-8.

Feng L, Li X, Li H, Yang W, Chen L, Guan Y. Enhancement of sensitivity of paper-based sensor array for the identification of heavy-metal ions. Analytica chimica acta. May 30, 2013;780:74-80.

* cited by examiner

[Fig. 1a]
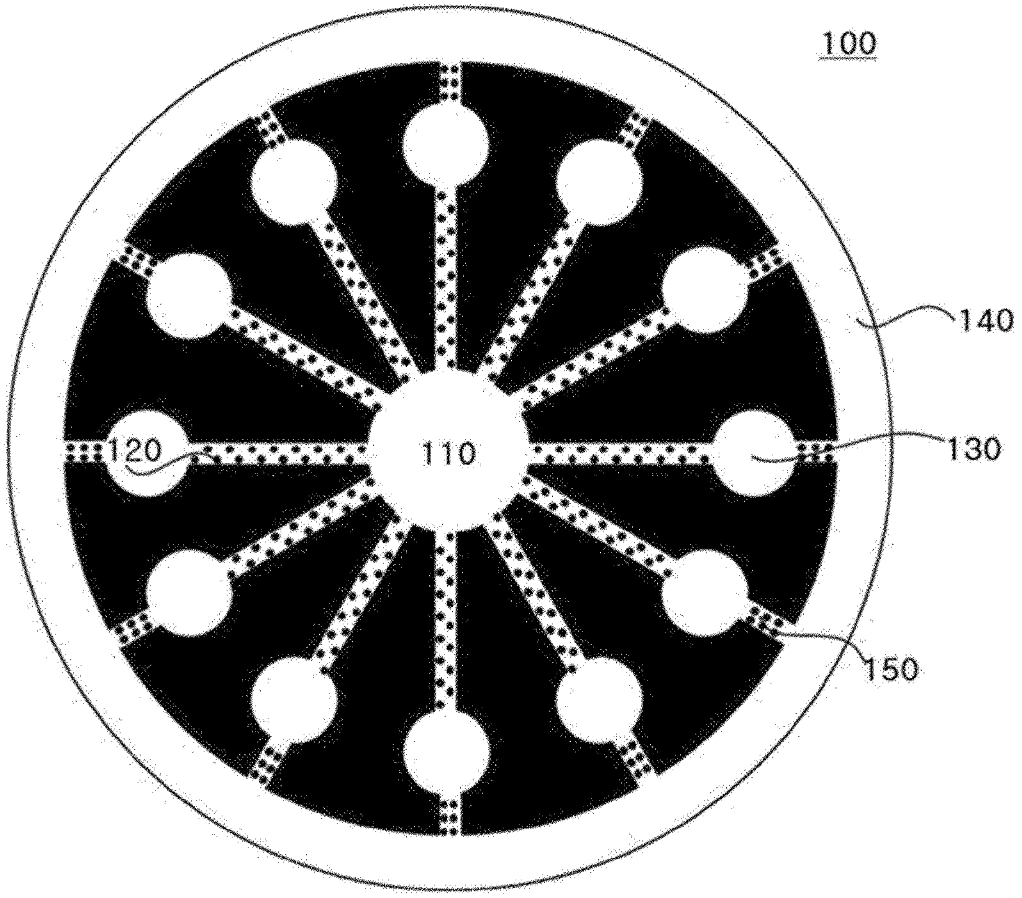

[Fig. 1b]
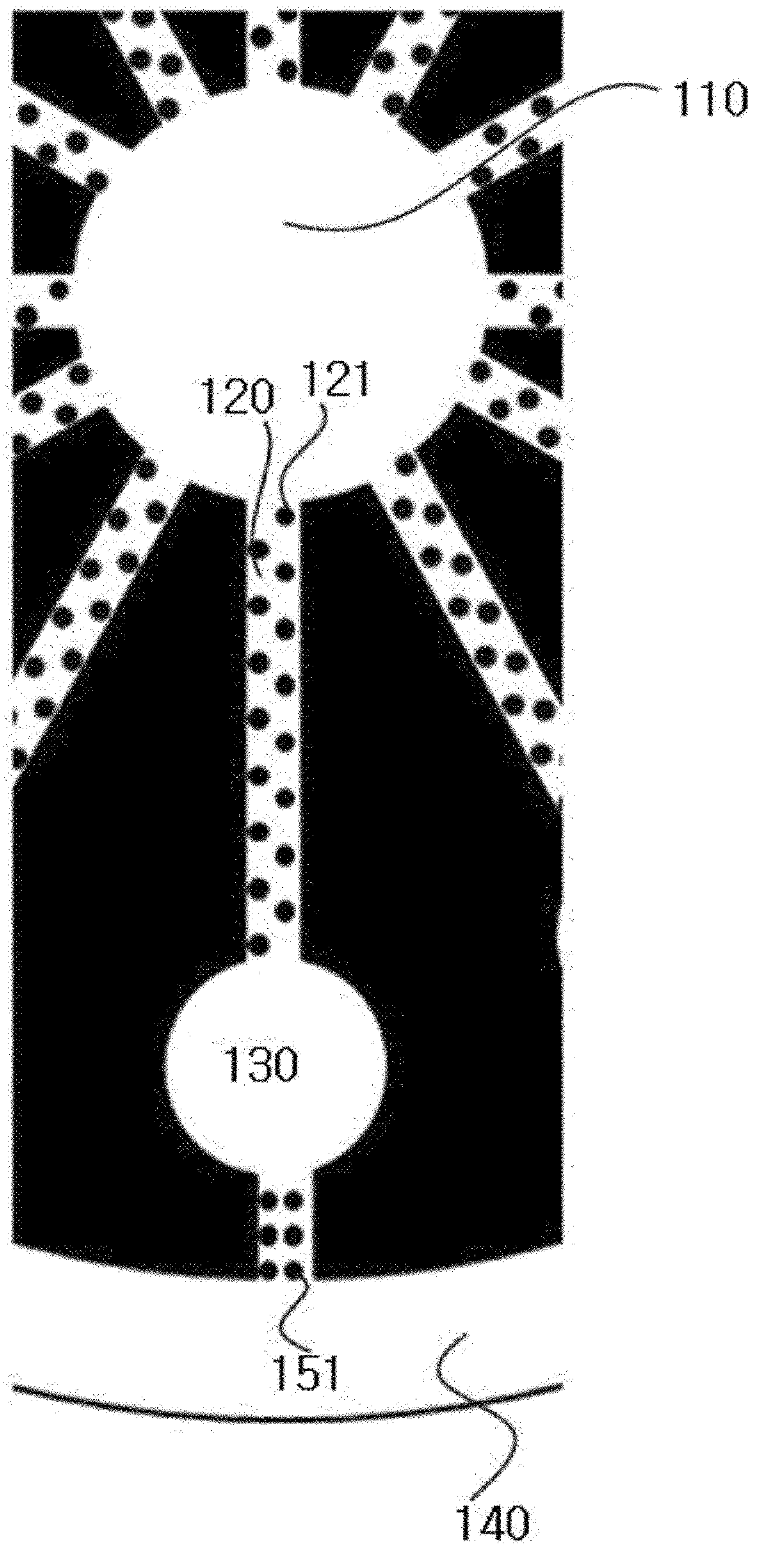

[Fig. 2]
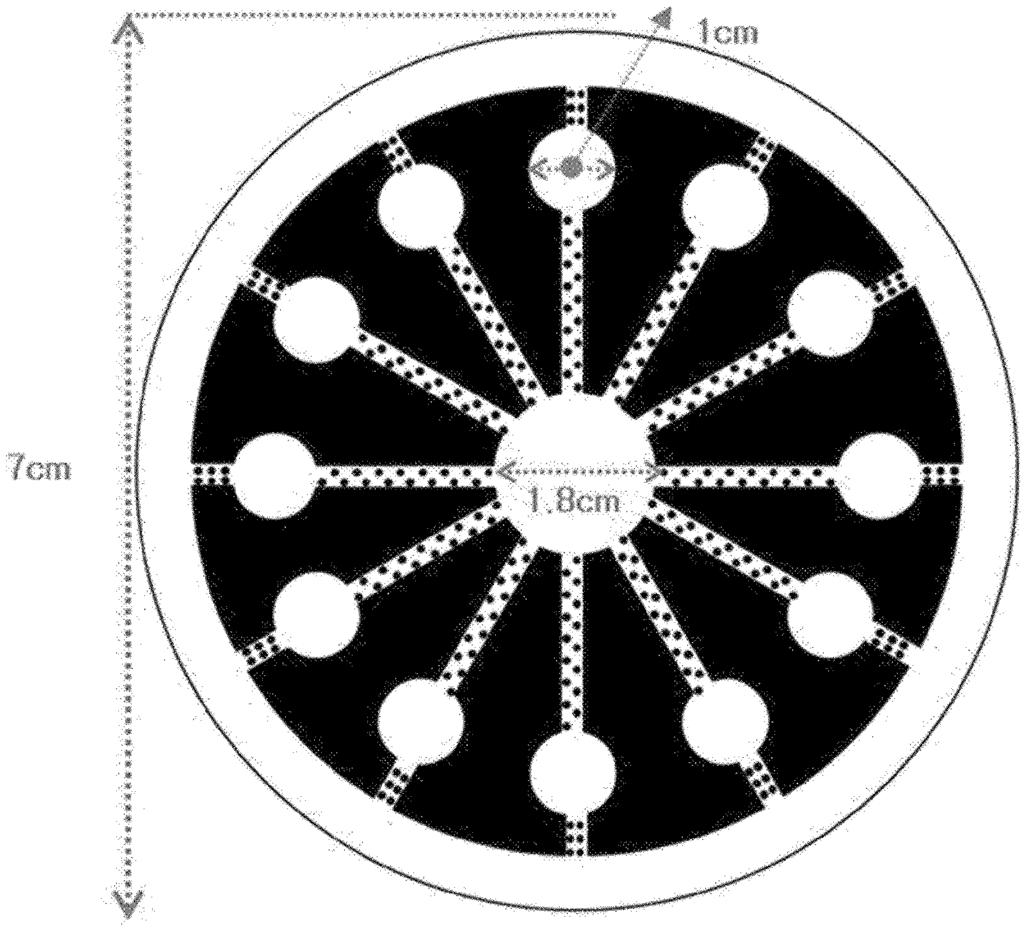

[Fig. 3]
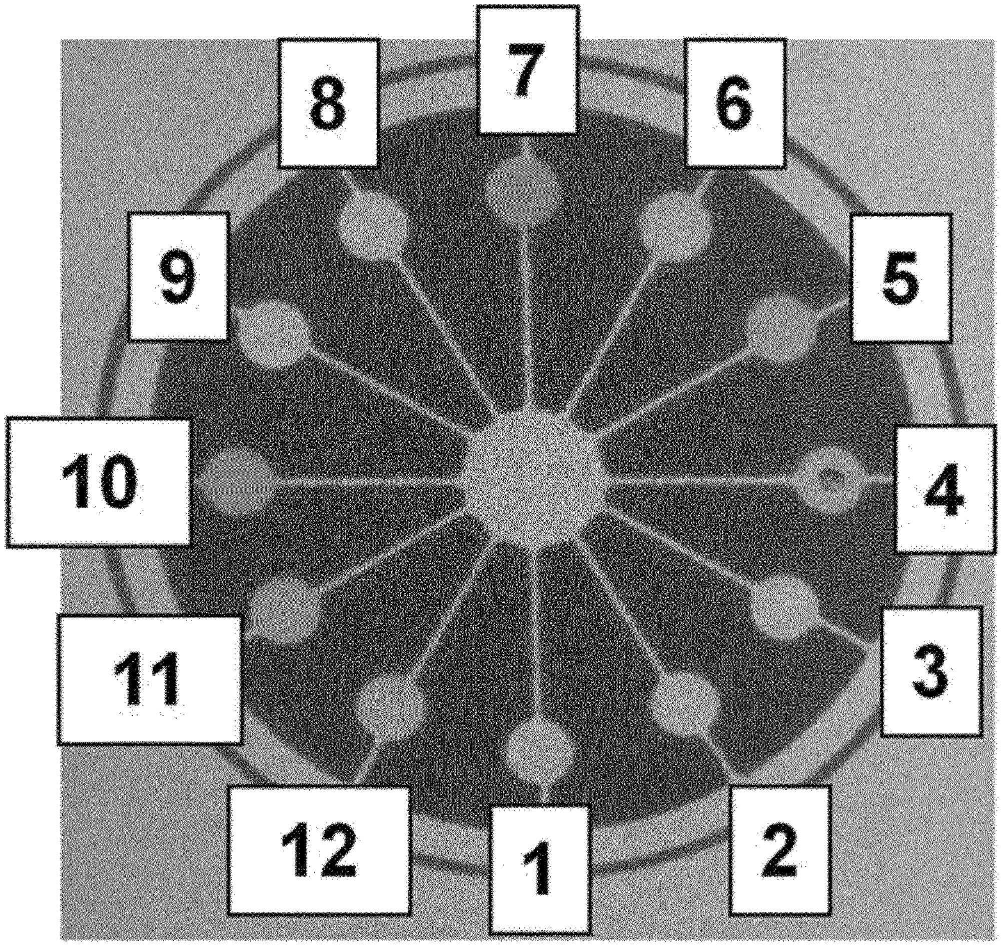
[Fig. 4a]
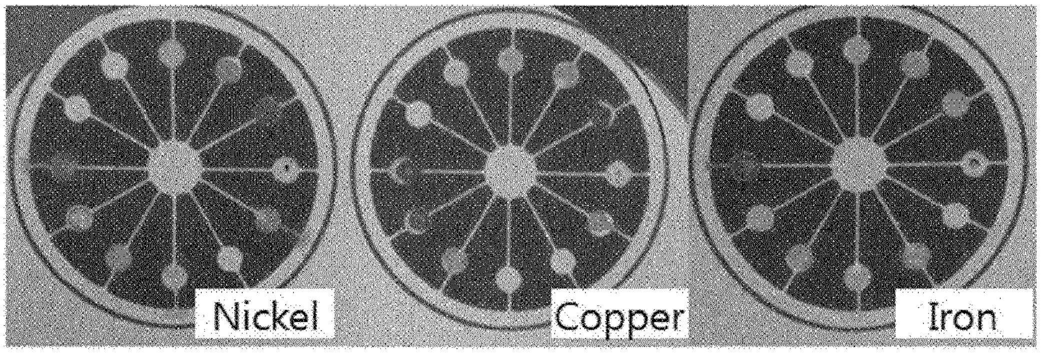

[Fig. 4b]
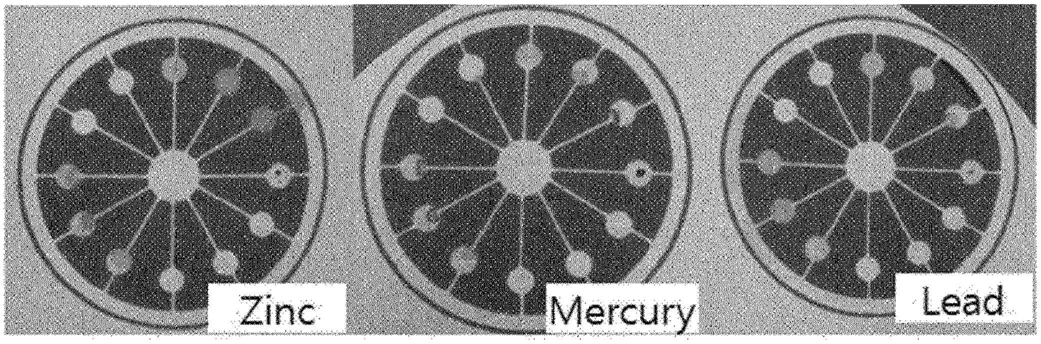
[Fig. 4c]
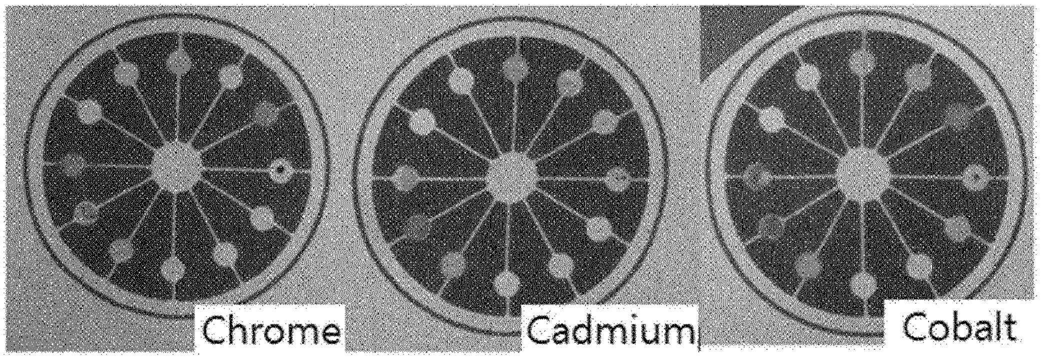
[Fig. 4d]
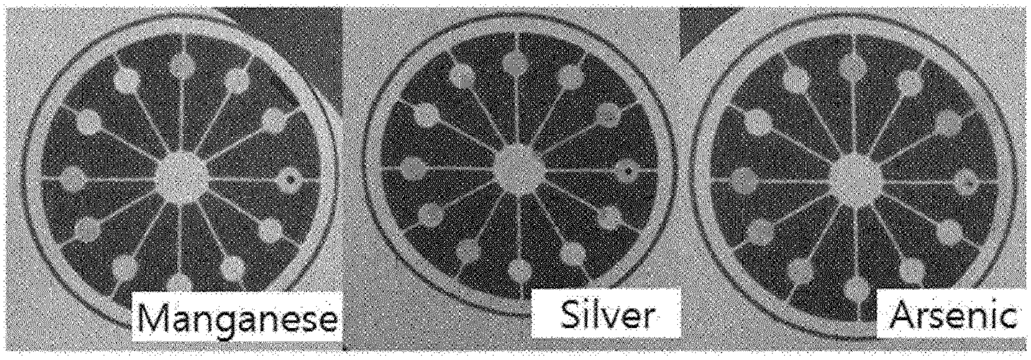

[Fig. 5]
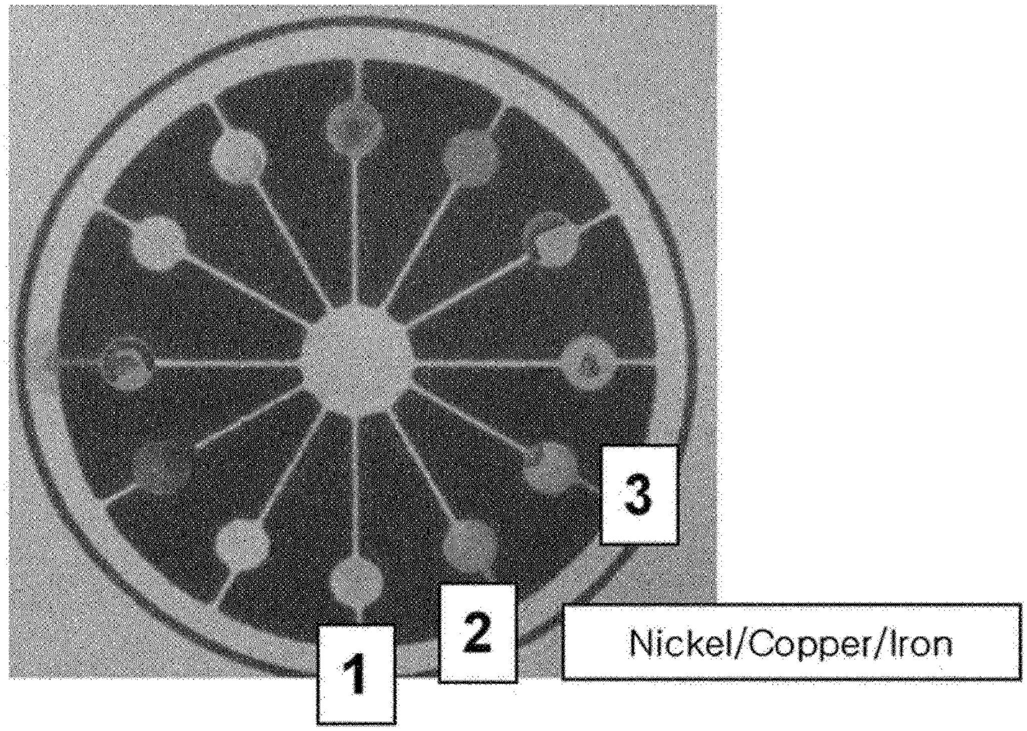
[Fig. 6a]
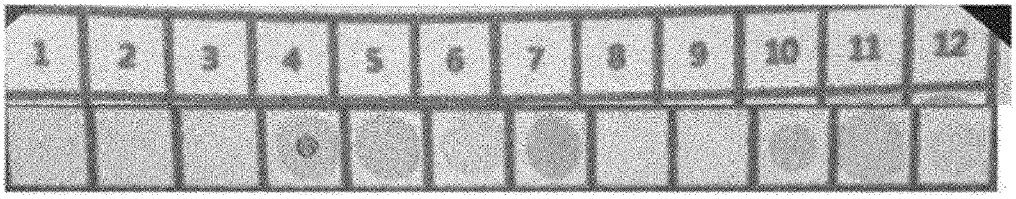

[Fig. 6b]
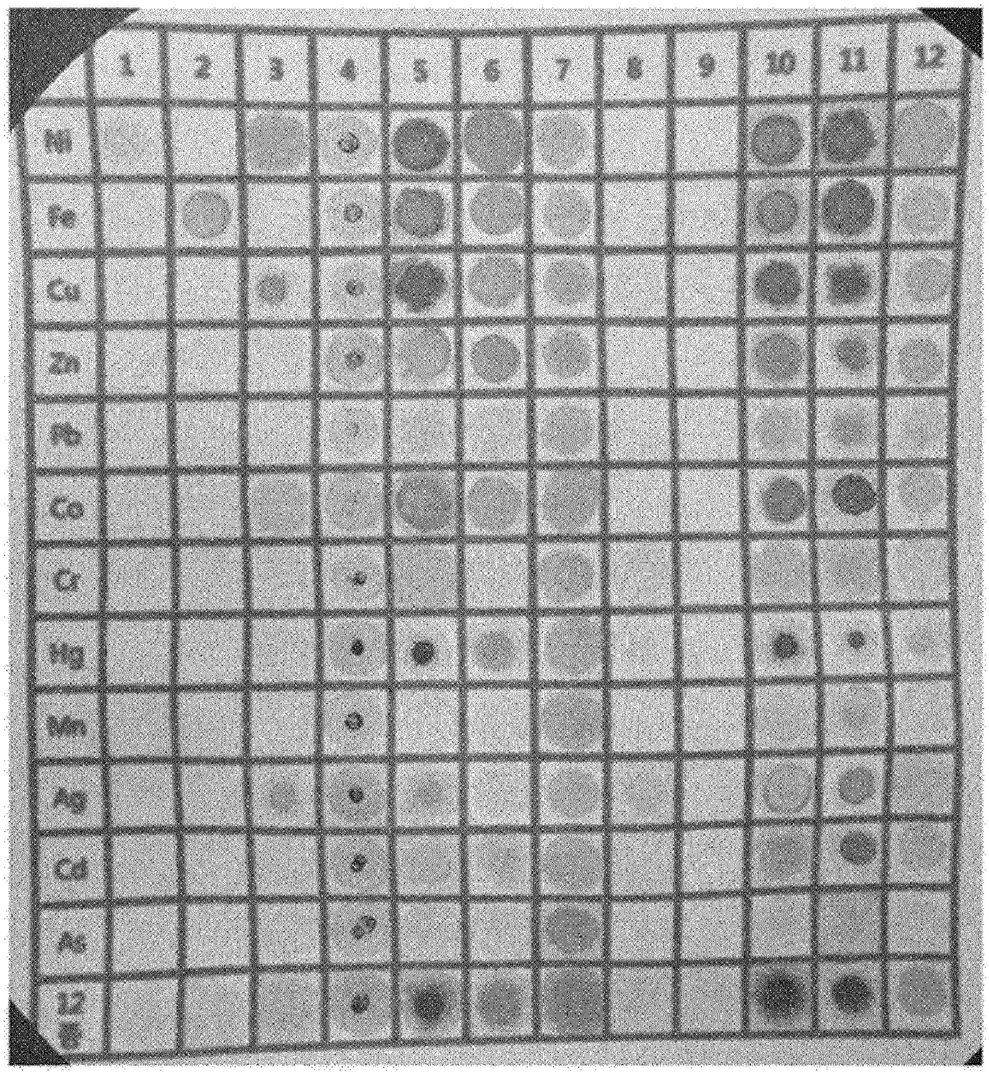
[Fig. 7]
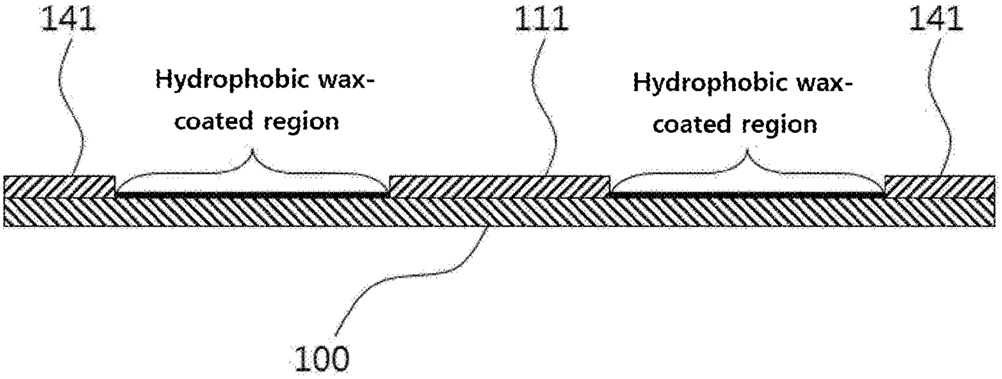

HIGH-SPEED SCREENING AND ANALYSIS SYSTEM FOR REACTION OPTIMIZATION

CROSS-REFERENCE TO RELATED APPLICATIONS

The present application is a national phase entry under 35 U.S.C. § 371 of International Application No. PCT/KR2019/011045 filed on Aug. 29, 2019, which claims priority to Korean Patent Application No. 10-2018-0102650, filed on Aug. 30, 2018, the disclosures of which are incorporated herein by reference in their entirety.

BACKGROUND OF THE INVENTION

1. Field of the Invention

The present invention relates to a high speed screening analysis system for reaction optimization, and more particularly, to a system that enables to simultaneously analyze chemical reactions between a sample and a plurality of substances to perform analysis on the sample at high speed, while performing analysis on the sample at low cost, by controlling fluid with paper.

2. Description of the Related Art

In general, high-throughput screening techniques are used for reaction optimization in chemical synthesis or drug development. High-throughput screening allows for rapid optimization of chemical reactions to achieve the desired target substance. However, the existing screening analysis method has a problem that it has a bulky equipment due to the system configured based on automatic dispensing equipment and it has high cost due to use of many reagents for reaction optimization.

SUMMARY OF THE INVENTION

In order to solve the above-mentioned problems of the prior art, the present invention is to provide an economical and inexpensive screening analysis system alternative to an expensive screening system, while rapidly screening chemical reactions and performing simultaneous analysis of chemical reactions between one sample and a plurality of substances.

In addition, the present invention is to provide a screening analysis system that can stably distribute fluid to each reaction zone even in the case of excess sample injection.

In addition, the present invention is to provide a system that can improve detection sensitivity by making a concentration of sample uniform during moving in channels and by lowering a speed of entering reaction zones.

In addition, the present invention is to provide a screening analysis system that incineration can be carried out to prevent external contamination after chemical reactions of a sample and a plurality of organic substances.

The high speed screening analysis system according to one embodiment of the present invention may comprise:

a sample injection part for introducing a sample;

a plurality of reactant-coating parts disposed radially around the sample injection part and coated with a substance reacting with the sample;

a plurality of injecting micro channels connecting the sample injection part and the plurality of reactant-coating parts, each of the injecting micro channels being connected with each of the reactant-coating parts; and an absorbing part connected with the reactant-coating parts and for absorbing remaining sample after reaction in the reactant-coating parts, wherein other parts than the sample injection part, the reactant-coating parts, the injecting micro channels, and the absorbing part on a plate-shaped material are formed by coating with hydrophobic wax.

In addition, the high speed screening analysis system according to one embodiment of the present invention may further comprise a plurality of discharging micro channels connecting the plurality of reactant-coating parts and the absorbing part, each of the discharging micro channels being connected with each of the reactant-coating parts.

In addition, in the high speed screening analysis system according to one embodiment of the present invention, each of the injecting micro channels and the discharging micro channels may have a micropillar structure, and the micropillar structure may be comprised of dots patterned with wax and having a regular arrangement.

In addition, in the high speed screening analysis system according to one embodiment of the present invention, the high speed screening analysis system may be manufactured by patterning of wax on a hydrophilic disc-shaped material, the sample injection part may be located at the center of the hydrophilic disc-shaped material, each of pairs of the injecting micro channel, the reactant-coating part and the discharging micro channel may be disposed radially around the sample injection part, and the edge of the hydrophilic disc-shaped material may form an absorbing part.

In addition, in the high speed screening analysis system according to one embodiment of the present invention, the hydrophilic disc-shaped material may be paper, and the high speed screening analysis system may be manufactured by applying a temperature of 150° C. for 50 seconds to the disk-shaped wax-patterned paper.

In addition, in the high speed screening analysis system according to one embodiment of the present invention, each of the reactant-coating parts may detect at least one selected from the group consisting of nickel, copper, iron, zinc, mercury, lead, chromium, cadmium, cobalt, manganese, silver and arsenic.

In addition, in the high speed screening analysis system according to one embodiment of the present invention, the sample injection part may comprise a sample injection pad in which the sample is absorbed, the sample injection pad may be coupled to protrude from the surface of the plate-shaped material, and the sample injection pad may be made of the same material as the plate-shaped material.

In addition, in the high speed screening analysis system according to one embodiment of the present invention, the sample absorbing part may comprise a sample absorbing pad in which the sample is absorbed, the sample absorbing pad may be coupled to protrude from the surface of the plate-shaped material, and the sample absorbing pad may be made of the same material as the plate-shaped material.

EFFECT OF THE INVENTION

The present invention relates to a high speed screening analysis system, in which micro channels through which fluid flows can be created by creating hydrophobic regions through wax patterning on a hydrophilic plate-shaped material such as paper, without an instrument such as an external pump or tube. In addition, it is possible to move one sample to a plurality of reaction zones by a design of wax patterning on a hydrophilic plate-shaped material such as paper.

In addition, according to the present invention, since a separate control unit is not required, there is an advantage that it is economical and portable.

In addition, according to the present invention, the high speed screening analysis system has advantages of low cost and easy of disposal, thereby avoiding external contamination.

In addition, according to the present invention, there is an advantage that it is possible to simultaneously analyze chemical reactions between one sample and a plurality of substances, and thus it can be applied to the production of reaction screening between heavy metals and organic ligands and of antigen screening for biosensor detection.

In addition, according to the present invention, there is an advantage that the fluid can be stably distributed to each reaction zone to react even in the case of excessive sample injection.

In addition, the present invention has the advantage of improving detection sensitivity by making a concentration of sample uniform during moving in channels and by lowering a speed of entering reaction zones.

BRIEF DESCRIPTION OF THE DRAWINGS

FIG. 1*a* shows a high speed screening analysis system 100 according to one embodiment of the invention, and FIG. 1*b* shows one main portion of the high speed screening analysis system 100 of FIG. 1*a*.

FIG. 2 shows exemplary dimensions of the high speed screening analysis system 100 of FIG. 1*a*.

FIG. 3 illustrates one embodiment of the high speed screening analysis system 100 including reactant-coating parts 130 coated with twelve kinds of organic ligands, respectively.

FIGS. 4*a* to 4*d* illustrate experimental examples of screening reactivity of organic ligands and heavy metal ions when the sample including each of nickel, copper, iron, zinc, mercury, lead, chromium, cadmium, cobalt, manganese, silver and arsenic is injected into the high speed screening analysis system 100 of FIG. 3.

FIG. 5 illustrates an experimental example of screening the reactivity between organic ligands and heavy metal ions when the sample including a plurality of kinds of heavy metals among the twelve kinds of heavy metals is injected into the high speed screening analysis system 100 of FIG. 3.

FIGS. 6*a* and 6*b* show the detection part before reaction of twelve kinds of heavy metals (FIG. 6*a*) and the detection part after reaction of twelve kinds of heavy metals (FIG. 6*b*), among the detection parts coated with the chelating agent in Table 1 for reaction for detecting twelve kinds of heavy metals according to the prior art.

FIG. 7 is a longitudinal cross-sectional view illustrating a high speed screening analysis system 100 according to one embodiment of the present invention.

DETAILED DESCRIPTION OF THE INVENTION

Hereinafter, a high speed screening analysis system according to one embodiment of the present invention will be described in detail. The accompanying drawings, which are included to provide a further understanding of the invention, illustrate embodiments of the invention and are not intended to limit the technical scope of the present invention.

In addition, the same or corresponding components will be denoted by the same reference numerals regardless of symbols, and redundant description thereof will be omitted. For convenience of explanation, the size and shape of each component shown may be exaggerated or reduced.

FIG. 1*a* shows a high speed screening analysis system 100 according to one embodiment of the invention, and FIG. 1*b* shows one main portion of the high speed screening analysis system 100 of FIG. 1*a*. The high speed screening analysis system 100 according to an embodiment of the present invention is manufactured on a hydrophilic plate-shaped material such as paper, and comprises a sample injection part 110, an injecting micro channel 120, a reactant-coating part 130, and an absorbing part 140.

A sample is introduced into the sample injection part 110. As the sample is dropped into the sample injection part 110, the sample moves from the sample injection part 110 to the reactant-coating part 130. The sample injection part 110 is not coated with wax and is made of a hydrophilic material (for example, paper) itself.

A plurality of the reactant-coating parts 130 may be provided and disposed radially, for example, around the sample injection part 110. For example, twelve reactant-coating parts 130 may be provided as shown in FIG. 1*a*. However, the present invention is not limited thereto and may be embodied by variously modifying the number according to the environment in which the present invention is implemented. The reactant-coating part 130 is not coated with wax, and is made of the hydrophilic material itself. In addition, the reactant-coating part 130 may be coated with a substance that can react with the sample.

Each of the reactant-coating parts 130 may be coated with different organic ligands. For example, each of the twelve reactant-coating parts 130 of FIG. 1*a* may be coated with twelve different organic ligands, respectively.

Injecting micro channels 120 are also provided as many as the number of reactant-coating parts 130, and each of the injecting micro channels 120 connects the sample injection part 110 with each of the reactant-coating parts 130.

In addition, the injecting micro channel 120 may have a micropillar structure, as shown in FIG. 1*a*. The micropillar structure refers to a structure in which the plurality of pillars are arranged regularly. For example, the plurality of micropillars 121 may be arranged in the injecting micro channel 120 at equal intervals. The injecting micro channel 120 is not coated with wax, but is made of a hydrophilic material itself, and the micropillar 121 may be formed of a hydrophobic wax-coated portion.

By providing the micropillars 121 in the injecting micro channel 120, while the sample moves in the injecting micro channel 120, the sample is vortexed by the micropillars 121 and thus the sample in the injecting micro channel 120 can move uniformly without rapidly moving to the reactant-coating part 130. In detail, while the sample moves through the injecting micro channel 120, the vortex effect of the components in the sample is occurred around the pillar by the hydrophobic micropillar 121. Therefore, the reaction may occur uniformly in the region where the reactant is coated. In addition, since the speed of the sample moving to the reactant-coating part 130 decreases due to the micropillar 121, thereby securing sufficient reaction time and improving detection sensitivity.

The micropillar 121 may be formed in a dot shape. Accordingly, the plurality of micropillars 121 arranged may have a configuration having a pattern in which the plurality of points are arranged spaced apart at regular intervals or at equal intervals.

The absorbing part 140 is connected with the reactant-coating part 130. Samples remaining after reacting in the reactant-coating part 130 may be absorbed in the absorbing part 140. The absorbing part 140 is not coated with wax, and is made of a hydrophilic material itself. High speed screening analysis system 100 according to an embodiment of the present invention has a structure coated with wax on a hydrophilic material. Therefore, in the case where the absorbing part 140 is not provided at the edge of the high speed screening analysis system 100, which is a sensor composed of a hydrophilic material (paper), sample overflow may occur in the injecting micro channel 120, the reactant-coating part 130, and/or the discharging micro channel 150 when the amount of the sample exceeds the amount that can be accommodated by the sensor. In addition, in the case where the amount of the sample to be injected is increased, the absorbing part 140 is required to sufficiently move heavy metals contained in the sample to the reactant-coating part 130 to cause a reaction.

In other words, the presence of the absorbing part 140 allows the sample to better pass through the reactant-coating part 130 without retention in a particular zone, even in the case of excessive sample injection. In addition, by moving the sample to the absorbing part 140, the sample may continuously and uniformly be reacted while the sample from the sample injection part 110 passes through the reactant-coating part 130.

Meanwhile, the reactant-coating part 130 and the absorbing part 140 may be connected by the discharging micro channel 150, for example. The discharging micro channel 150 is not coated with wax, but is made of a hydrophilic material itself. Like the injecting micro channel 120, the discharging micro channel 150 may have a micropillar structure having a plurality of micropillars 151. The micropillar 151 may be formed of a hydrophobic wax-coated portion. A description overlapping with the description of the micropillar structure described in the injecting micro channel 120 will be omitted.

In summary, in the high speed screening analysis system 100 according to an embodiment of the present invention, there are disposed in the order of sample injection part 110-injecting micro channel 120-reactant-coating part 130-absorbing part 140 or there are disposed in the order of sample injection part 110-injecting micro channel 120-reactant-coating part 130-discharging micro channel 150-absorbing part 140.

In addition, the high speed screening analysis system 100 according to an embodiment of the present invention may be implemented in a configuration in which wax is coated on the hydrophilic plate-shaped material, as described above. The hydrophilic plate-shaped material may be made of, for example, paper, cellulose, or cotton, but in some cases various modifications and changes are possible such as wax coating on glass that is not hydrophilic. The high speed screening analysis system 100 may be implemented by, for example, a disc-shaped paper. In such a case, the sample injection part 110 is positioned at the center of the disc-shaped paper, and a plurality of pairs of injecting micro channel 120, reactant-coating part 130 and discharging micro channel 150 may be radially disposed around the sample injection part 110, respectively. The edge (circumference) of the disc-shaped paper may form an absorbing part 140.

However, the present invention is not limited to the above description, and the sample injection part 110 may be positioned at the center of the regular polygonal paper, and a plurality of pairs of injecting micro channel 120, reactant-coating part 130 and discharging micro channel 150 may be radially disposed, respectively. In addition, the shape of the high speed screening analysis system 100 and the arrangement of each component may be modified and changed in accordance with various environments in which the present invention is implemented.

FIG. 2 shows exemplary dimensions of the high speed screening analysis system 100 of FIG. 1*a*. However, the present invention is not limited to the dimensions shown in FIG. 2, and may be implemented by modifying and changing the dimensions of the high speed screening analysis system 100 in accordance with various environments in which the present invention is implemented.

As illustrated in FIG. 7, the sample injection part 110 may comprise a sample injection pad 111 in which the sample is absorbed, and the absorbing part 140 may include a sample absorbing pad 141 in which a sample is absorbed.

The sample injection pad 111 is coupled to protrude from the surface of the plate-shaped material, and may be made of the same material as the plate-shaped material. Also, the sample absorbing pad 141 is coupled to protrude from the surface of the plate-shaped material, and may be made of the same material as the plate-shaped material. That is, the sample injection pad 111 and the sample absorbing pad 141 may be manufactured in the same shape as that of the region of the sample injection part 110 and the region of the absorbing part 140, respectively, and coupled to the region of the sample injection part 110 and the region of the absorbing part 140 on the plate-shaped material, respectively. The sample injection pad 111 and the sample absorbing pad 141 may be made of, for example, paper, cellulose, or cotton, but in some cases various modifications and changes are possible such as wax coating on glass that is not hydrophilic.

The sample injection pad 111 and the sample absorbing pad 141 may be manufactured to have different densities from the plate-shaped material depending on the conditions for the storage capacity and the absorbing force of the sample. For example, the sample injection pad 111 and the sample absorbing pad 141 may be porous.

Examples

Hereinafter, an example in which the high speed screening analysis system 100 according to an example of the present invention is implemented as a high speed screening analysis system for optimizing heavy metal-organic ligand reaction will be described.

The high speed screening analysis system 100 may be implemented as a system based on disc-shaped paper. One sample injection part 110 may be provided at the center of the disc-shaped paper, and twelve reactant-coating parts 130 which are disposed radially around the sample injection part 110 may be provided. Twelve injecting micro channels 120 may be provided, and each of the injecting micro channels 120 may connect the sample injection part 110 and each of the reactant-coating parts 130. The absorbing part 140 may be disposed along the edge of the disc-shaped paper. Twelve discharging micro channels 150 may be provided and each of the discharging micro channels may connect each of the reactant-coating parts 130 and the absorbing part 140.

The high speed screening analysis system 100 according to the above embodiment is designed with a drawing program (e.g., Powerpoint) as shown in FIG. 1*a*. The drawing is printed on paper (e.g., Whatman filter paper (Grade 1)) by a wax printer (e.g., Wax Printer (ColorQube 8570, Xerox)). Next, a temperature of 150° C. is applied for 50 seconds to allow the wax in the wax-patterned region (the portion shown in black in FIG. 1*a*) to be deeply soaked into the wax-patterned filter paper. Then, twelve kinds of organic ligands are dropped in 1 μL to 2 μL into a region to be each of the reactant-coating parts 130, and then dried to generate each of the reactant-coating parts 130, which is a detection area capable of reacting with heavy metals. Then, the absorbing pad is attached to the region of the sample injection part 110 on the top of the printed paper and a PET film is bonded to the bottom of the printed paper, thereby completing the high speed screening analysis system 100.

In this regard, FIG. 3 illustrates one embodiment of the high speed screening analysis system 100 including reactant-coating parts 130 coated with twelve kinds of organic ligands, respectively, as shown in Table 1 below.

TABLE 1

| Number of reactant-coating part 130 | Chelating agent (Concentration) |
|---|---|
| 1 | DMG(100 mM) |
| 2 | Bphen (10 mM) |
| 3 | DTO (50 mM) |
| 4 | DTZ (50 mM) |
| 5 | DCB (100 mM) |
| 6 | PAN (10 mM) |
| 7 | EBT (50 mM) |
| 8 | 4-APT (100 mM) |
| 9 | BCP (10 mM) |
| 10 | PAN(10 mM)/DCB (100 mM) |
| 11 | DCB(100 mM)/BCP (10 mM) |
| 12 | PAN(10 mM)/4-APT (100 mM) |

In the table, PAN represents 1-(2-pyridylazo)-2-naphthol, Bphen represents bathophenanthroline, DMG represents dimethylglyoxime, DTO represents dithiooxamide, DCB represents diphenylcarbazide, DTZ represents dithizone, 4-ATP represents 4-aminothiophenol, EBT represents Erichrome Black T, and BCP represents bathocuprine. In addition, FIGS. 4*a* to 4*d* illustrate experimental examples of screening reactivity of organic ligands and heavy metal ions when the sample including each of nickel, copper, iron, zinc, mercury, lead, chromium, cadmium, cobalt, manganese, silver and arsenic is injected into the high speed screening analysis system 100 of FIG. 3.

Specifically, FIG. 4*a* illustrates a case where the reaction occurs in the No. 1, No. 3, No. 5, No. 6, No. 10, No. 11 and No. 12 of reactant-coating part 130 when nickel is included in the sample, a case where the reaction occurs in the No. 3, No. 5, No. 6, No. 8, No. 10, No. 11 and No. 12 of reactant-coating part 130 when copper is included in the sample, and a case wherein the reaction occurs in the No. 1, No. 2, No. 6, No. 10 and No. 12 of reactant-coating part 130 when iron is included in the sample.

In addition, FIG. 4*b* illustrates a case where the reaction occurs in the No. 5, No. 6, No. 10, No. 11 and No. 12 of reactant-coating part 130 when zinc is included in the sample, a case where the reaction occurs in the No. 5, No. 6, No. 10, No. 11 and No. 12 of reactant-coating part 130 when mercury is included in the sample, and a case wherein the reaction occurs in the No. 5, No. 6, No. 10, No. 11 and No. 12 of reactant-coating part 130 when lead is included in the sample.

In addition, FIG. 4*c* illustrates a case where the reaction occurs in the No. 5, No. 10 and No. 11 of reactant-coating part 130 when chrome is included in the sample, a case where the reaction occurs in the No. 6, No. 10, No. 11 and No. 12 of reactant-coating part 130 when cadmium is included in the sample, and a case wherein the reaction occurs in the No. 3, No. 5, No. 6, No. 10, No. 11 and No. 12 of reactant-coating part 130 when cobalt is included in the sample.

In addition, FIG. 4*d* illustrates a case where the reaction occurs in the No. 5 and No. 11 of reactant-coating part 130 when manganese is included in the sample, a case where the reaction occurs in the No. 4, No. 5, No. 8, No. 10 and No. 11 of reactant-coating part 130 when silver is included in the sample, and a case wherein the reaction occurs in the No. 5, No. 10 and No. 11 of reactant-coating part 130 when arsenic is included in the sample.

FIG. 5 illustrates an experimental example of screening the reactivity between organic ligands and heavy metal ions when the sample including the plurality of kinds of heavy metals among the twelve kinds of heavy metals is injected into the high speed screening analysis system 100 of FIG. 3. It shows a case where the reaction occurs in the No. 1, No. 2 and No. 3 of the twelve reactant-coating parts 130, which appears pink, green, and red, respectively. This is because that nickel and DMG react selectively to form a pink chelate in the No. 1 of reactant-coating part, iron and Bphen react selectively to form red chelate in the No. 2 of reactant-coating part, and copper and DTO react selectively to form a green chelate in the No. 3 of reactant-coating part. That is, it can be confirmed that the sample contains nickel, iron and copper by observing the color change according to the reaction with heavy metals in No. 1, No. 2 and No. 3.

According to the present invention, since the reactions are carried out simultaneously in the twelve reactant-coating parts 130 connected with one sample injection part 110, there is an advantage that it can detect at the same time the case of including the plurality of kinds of heavy metals as well as the case of including one heavy metal among the above-described twelve kinds of heavy metals in the sample.

Comparative Example

FIGS. 6*a* and 6*b* show the detection part before reaction of twelve kinds of heavy metals (FIG. 6*a*) and the detection part after reaction of twelve kinds of heavy metals (FIG. 6*b*), among the detection parts coated with the chelating agent in Table 1 for reaction for detecting twelve kinds of heavy metals according to the prior art. According to the conventional heavy metal detection method, in order to identify reactions between twelve kinds of heavy metals and twelve kinds of organic ligands, the reactions are performed by injecting substances one by one into the reaction zones of 12×12 array. Such a conventional method has a disadvantage that the reaction takes a long time, and experimental errors may occur due to the complex method, which leads to a deviation in the experimental result.

It will be appreciated that the technical configuration of the present invention described above may be embodied in other specific forms by those skilled in the art without changing the technical spirit or essential features of the present invention. Therefore, it is to be understood that the embodiments described above are exemplary in all respects and not restrictive. In addition, the scope of the present invention is indicated by the appended claims to be described later rather than the detailed description above. In addition, it should be construed that all changes or modifications derived from the meaning and scope of the claims and equivalent concepts thereof are included in the scope of the present invention.

INDUSTRIAL AVAILABILITY

The present invention relates to a high speed screening analysis system, in which micro channels through which fluid flows can be created by creating hydrophobic regions through wax patterning on a hydrophilic plate-shaped material such as paper, without an instrument such as an external pump or tube. In addition, it is possible to move one sample to a plurality of reaction zones by a design of wax patterning on a hydrophilic plate-shaped material such as paper.

In addition, according to the present invention, since a separate control unit is not required, there is an advantage that it is economical and portable.

In addition, according to the present invention, the high speed screening analysis system has advantages of low cost and easy of disposal, thereby avoiding external contamination.

In addition, according to the present invention, there is an advantage that it is possible to simultaneously analyze chemical reactions between one sample and a plurality of substances, and thus it can be applied to the production of reaction screening between heavy metals and organic ligands and of antigen screening for biosensor detection.

In addition, according to the present invention, there is an advantage that the fluid can be stably distributed to each reaction zone to react even in the case of excessive sample injection.

In addition, the present invention has the advantage of improving detection sensitivity by making a concentration of sample uniform during moving in channels and by lowering a speed of entering reaction zones.

What is claimed is:

1. A high speed screening analysis system for reaction optimization, comprising:

a sample injection part configured to receive a sample;

a plurality of reactant-coated parts, disposed radially around the sample injection part and coated with a substance capable of reacting with the sample;

a plurality of injecting micro channels connecting the sample injection part and the plurality of reactant-coated parts, each of the injecting micro channels being connected with each of the reactant-coated parts;

an absorbing part configured to absorb remaining sample after reaction in the reactant-coated parts;

a plurality of discharging micro channels connecting the plurality of reactant-coated parts and the absorbing part, each of the discharging micro channels being connected with each of the reactant-coated parts; and a hydrophilic disc-shaped material which is fully coated with a hydrophobic wax except for the sample injection part, the reactant-coated parts, the injecting micro channels, the discharging micro channels, and the absorbing part, wherein the absorbing part is formed in a continuous ring shape at an edge of the hydrophilic disc-shaped material, and wherein the reactant of each of the reactant-coated parts consists of a reactant only to detect at least one selected from the group consisting of nickel, copper, iron, zinc, mercury, lead, chromium, cadmium, cobalt, manganese, silver and arsenic, wherein each of the injecting micro channels and the discharging micro channels has a micropillar structure, and wherein the micropillar structure is comprised of dots patterned with the hydrophobic wax and having a regular arrangement.

2. The high speed screening analysis system for reaction optimization according to claim 1, wherein:

the high speed screening analysis system is manufactured by patterning of the hydrophobic wax on the hydrophilic disc-shaped material, the sample injection part is located at a center of the hydrophilic disc-shaped material, each of the injecting micro channel, the reactant-coated part and the discharging micro channel are disposed radially around the sample injection part, and the edge of the hydrophilic disc-shaped material forms the absorbing part.

3. The high speed screening analysis system for reaction optimization according to claim 2, wherein:

the hydrophilic disc-shaped material is paper.

4. The high speed screening analysis system for reaction optimization according to claim 1, wherein:

the sample injection part comprises a sample injection pad configured to absorb the sample, the sample injection pad is coupled to protrude from a surface of the hydrophilic disc-shaped material, and the sample injection pad is made of the same material as the hydrophilic disc-shaped material.

5. The high speed screening analysis system for reaction optimization according to claim 1, wherein:

the absorbing part comprises a sample absorbing pad in which the sample is absorbed, the sample absorbing pad is coupled to protrude from a surface of the hydrophilic disc-shaped material, and the sample absorbing pad is made of the same material as the hydrophilic disc-shaped material.

* * * * *